(12) United States Patent
Takahashi et al.

(10) Patent No.: US 9,352,496 B2
(45) Date of Patent: May 31, 2016

(54) UTILITY VEHICLE

(71) Applicant: KAWASAKI JUKOGYO KABUSHIKI KAISHA, Hyogo (JP)

(72) Inventors: Keiji Takahashi, Akashi (JP); Yoshinori Tsumiyama, Miki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/140,004

(22) Filed: Dec. 24, 2013

(65) Prior Publication Data

US 2015/0175113 A1 Jun. 25, 2015

(51) Int. Cl.
| | |
|---|---|
| *B60R 21/13* | (2006.01) |
| *B62D 33/06* | (2006.01) |
| *B60P 1/28* | (2006.01) |
| *B29C 35/08* | (2006.01) |
| *B29D 11/00* | (2006.01) |
| *B29C 37/00* | (2006.01) |

(52) U.S. Cl.
CPC .............. *B29C 35/08* (2013.01); *B29C 37/0032* (2013.01); *B29D 11/00038* (2013.01); *B29D 11/00903* (2013.01); *B29C 2035/0827* (2013.01); *B29C 2037/0046* (2013.01)

(58) Field of Classification Search
CPC ........ B60R 21/06; B60R 21/02; B60R 21/13; B60R 21/026; B60R 7/005; B62D 23/005; B62D 33/0625; B62D 33/0617; B62D 33/06; B62D 33/02; B60P 1/283; B60P 1/28; Y10S 160/02
USPC .......... 296/24.43, 24.4, 183.2, 190.1, 190.08; 280/756, 748, 749; 298/17 R; 150/154, 150/166, 168; 160/DIG. 2
See application file for complete search history.

(56) References Cited

U.S. PATENT DOCUMENTS

| | | | | |
|---|---|---|---|---|
| 3,493,263 | A * | 2/1970 | Brown | B62D 33/02 105/374 |
| 6,467,828 | B1 * | 10/2002 | Grydbeck | B60R 21/026 280/749 |
| 6,905,159 | B1 | 6/2005 | Saito et al. | |
| 8,303,013 | B2 * | 11/2012 | Horiuchi et al. | 296/26.1 |
| 8,376,441 | B2 * | 2/2013 | Nakamura et al. | 296/65.01 |
| 8,752,878 | B2 * | 6/2014 | Yamamoto et al. | 296/26.08 |
| 2012/0256444 | A1 * | 10/2012 | Thurmon | 296/182.1 |

* cited by examiner

*Primary Examiner* — Keith Frisby
(74) *Attorney, Agent, or Firm* — Wenderoth, Lind & Ponack, L.L.P.

(57) ABSTRACT

A utility vehicle is equipped with a R.O.P.S. enclosing a passenger space, a cargo bed disposed behind the passenger space, and a screen disposed between the passenger space and the cargo bed. The screen is divided into an upper screen and a lower screen.

4 Claims, 11 Drawing Sheets

UTILITY VEHICLE

BACKGROUND OF THE INVENTION

1. Field of the Invention

The present invention relates to a utility vehicle, and more particularly, to a utility vehicle in which a screen is disposed between a cargo bed and a passenger space (riding space).

2. Description of the Related Art

In a utility vehicle, a screen is disposed between a passenger space and a cargo bed. This kind of screen is made of a member having openings, such as lath metal, so that the passengers of the vehicle can confirm the rearward view of the vehicle through the screen.

For example, the specification of U.S. Pat. No. 6,905,159 has disclosed a utility vehicle in which a screen is disposed in the front portion of a cargo bed.

In the case that the screen is disposed in the cargo bed, the weight of the cargo bed increases. In particular, in the case that the cargo bed is a dump type, time and labor required for dump work in which the cargo bed is raised increase because of the increase in the weight of the cargo bed. In addition, the rotation locus of the cargo bed increases during the dump work, and the rotation locus may interfere with the roof portion of the chassis of the vehicle, surrounding objects located around the upper part of the utility vehicle, etc. in some cases. In other words, in the case that a screen is added to the cargo bed, the screen is required to be designed in consideration of the interference of the rotation locus of the cargo bed with the roof portion of the chassis, surrounding objects located around the upper part of the utility vehicle, etc. whereby the degree of freedom of designing the screen is limited.

SUMMARY OF THE INVENTION

An object of the present invention is to provide a utility vehicle equipped with a screen capable of improving the degree of freedom of designing the screen while the weight increase of the cargo bed is suppressed.

In order to achieve the above-mentioned object, a utility vehicle according to the present invention is equipped with a R.O.P.S. enclosing a passenger space, a cargo bed disposed behind the passenger space, and a screen disposed between the passenger space and the cargo bed, wherein the screen is divided into an upper screen and a lower screen.

With the above-mentioned configuration, the upper screen and the lower screen can have different specifications and can be configured so as to conform to appropriate specifications suited for portions in which the upper screen and the lower screen are respectively disposed. Hence, the degree of freedom of designing the screen is improved, and the marketability of the screen can be improved.

In the above-mentioned utility vehicle, the following configurations can preferably be adopted.

(a) The upper screen is made of a member capable of allowing the passengers riding in the passenger space to have a rearward view from the vehicle.

With the above-mentioned configuration (a), rearward visibility can be ensured through the upper screen.

(b) The upper screen has the configuration (a), and openings through which the passengers riding in the passenger space can have the rearward view from the vehicle are not formed in the lower screen.

With the above-mentioned configuration (b), the upper screen and the lower screen are configured so as to have different specifications, and rearward visibility can be ensured through the upper screen.

(c) The lower screen is disposed at the cargo bed, the upper screen is disposed at the R.O.P.S., and the cargo bed is rotatably supported on the pivot shaft of the chassis of the vehicle so as to be movable up and down between a normal position in which the cargo bed is in a non-raised state and a dump position in which the cargo bed is in a raised state.

With the above-mentioned configuration (c), although the screen is configured so as to be extended in the direction of the height of the vehicle, the rotation locus of the cargo bed during dump operation can be made small, and the interference of the rotation locus of the cargo bed with the roof portion of the vehicle, surrounding objects, etc. is avoidable easily. Furthermore the degree of freedom of designing the screen can be improved.

(d) In addition to the configuration (c), the lower screen is made of a lightweight material.

With the above-mentioned configuration (d), the screen can be made lightweight. Hence, the workability of the dump operation of the cargo bed can be improved.

(e) In addition to the configuration (c), the upper screen is made of high-rigidity members.

With the above-mentioned configuration (e), the rigidity of the upper screen can be maintained.

DETAILED DESCRIPTION OF THE INVENTION

Embodiments according to the present invention will be described on the basis of the accompanying drawings.

[Overall Structure of the Vehicle]

Figure 1:
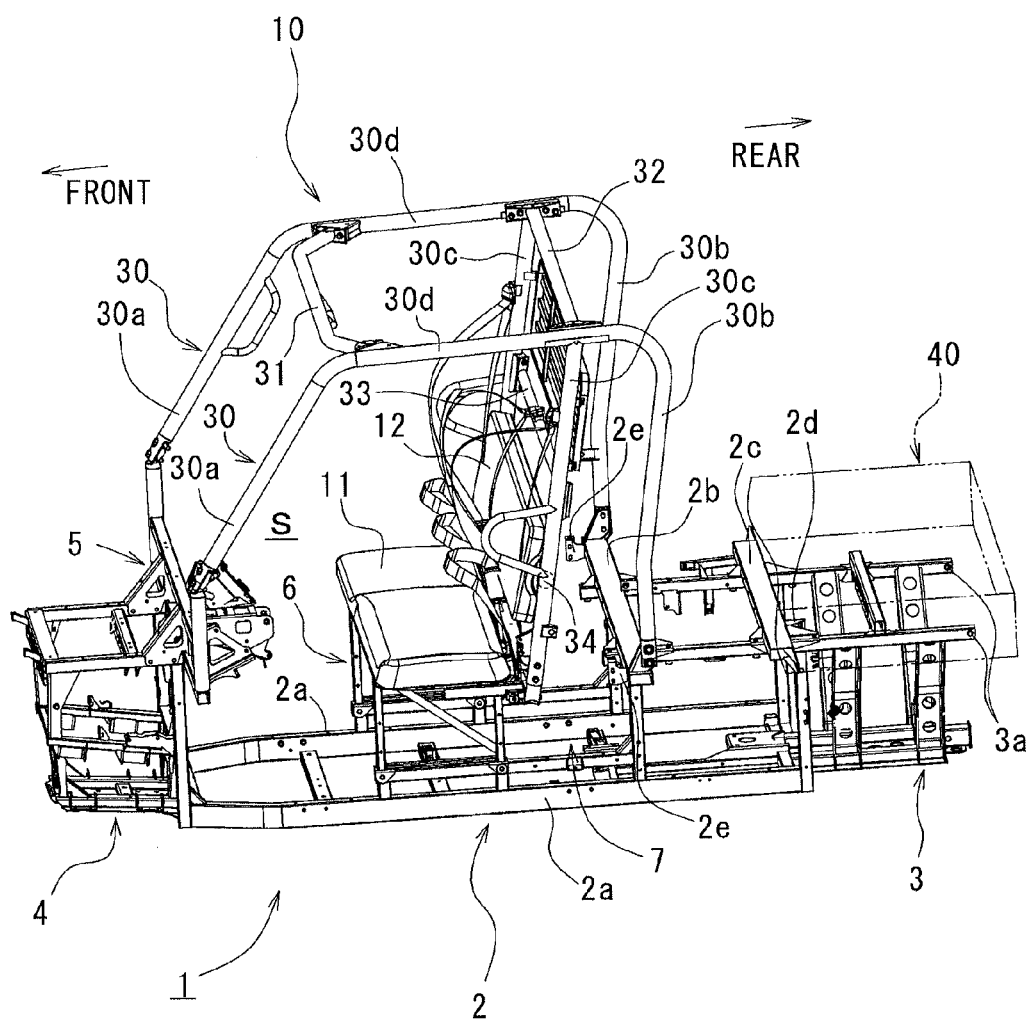
FIG. 1 is a perspective view showing the skeleton structure of a utility vehicle according to the present invention, seen from left above.

In FIG. 1, the skeleton of a utility vehicle according to the present invention includes a vehicle body frame (chassis) 1 being long in the front-rear direction of the vehicle and a R.O.P.S. 10 enclosing a passenger space S. In the passenger space S, one bench-type seat 11 and its backrest 12 are disposed. Instead of the bench-type seat 11, a plurality of independent seats may be arranged in a row in some cases.

R.O.P.S. is an abbreviation for roll-over protective structure. The R.O.P.S. 10 is detachably mounted on the vehicle body frame 1.

The vehicle body frame 1 is equipped with a main frame 2 having a pair of left and right main frame members 2a extended in the front-rear direction of the vehicle, a rear frame 3 formed at the rear end portion of the main frame 2, a bonnet frame 4 formed at the front end portion of the main frame 2, a dashboard frame 5 formed at the front upper end portion of the main frame 2, and a seat frame 6 disposed in the passenger space S.

A cargo bed support region for supporting a dump-type cargo bed 40 (indicated by a chain double-dashed line in FIG. 1) is formed in the range from the rear upper face of the main frame 2 to the upper face of the rear frame 3. Inside the main frame 2 and the rear frame 3 under the cargo bed support region, an engine room 7 is formed in which an engine and a transmission (not shown) are mounted. At the upper portion of the main frame 2, first and second cargo bed support members 2b and 2c are provided to support the cargo bed 40. The rear end lower portion of the R.O.P.S. 10 is mounted on the first cargo bed support member 2b, and the second cargo bed support member 2c is disposed at the rear portion of the main frame 2. Furthermore, on the front side and at both the left and right end portions of the first cargo bed support member 2b, cargo bed engaging means mounting portions 2e are provided to install a pair of left and right cargo bed engaging means 13 (refer to FIG. 3).

At the rear portion of the main frame 2, a frame-side gas damper mounting portion 2d is provided so as to be positioned above the substantially central portion of the rear portion in the vertical direction of the vehicle. At the rear portion of the rear frame 3, a pair of left and right cargo bed pivot portions 3a is provided so as to serve as the rotation fulcrum of the dump operation of the cargo bed 40.

The R.O.P.S. 10 includes a pair of left and right side units 30 made of metal pipes and first to fourth cross members 31 to 34 made of metal pipes and used to connect both the side units 30. Each side unit 30 is integrally equipped with a front pillar portion 30a, a rear pillar portion 30b, an intermediate pillar portion 30c, and an upper beam portion 30d. The front pillar portion 30a, the rear pillar portion 30b and the upper beam portion 30d are formed by bending and forming a single pipe member being circular in cross section into a substantially U shape in a side view. Each intermediate pillar portion 30c is disposed at a position approximately corresponding to the backrest 12 of the seat 11 and is fixed to a halfway portion of the upper beam portion 30d in the front-rear direction by welding.

Figure 2:
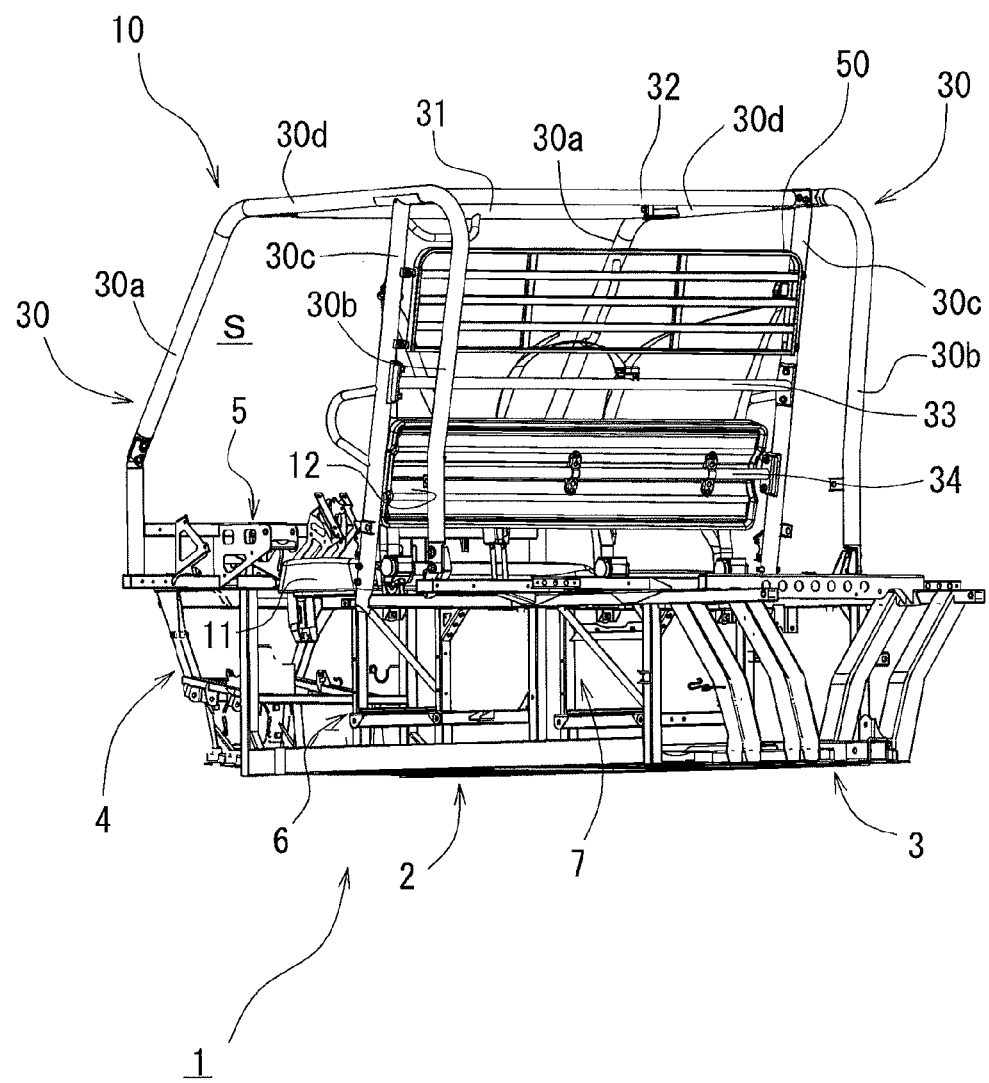
FIG. 2 is a perspective view showing the skeleton structure of the utility vehicle, seen from left rear.

Both the upper beam portions 30d are connected to each other using the first and second cross members 31 and 32. FIG. 2 is a perspective view showing the skeleton structure of the utility vehicle, seen from obliquely rear. As shown in FIG. 2, both the intermediate pillar portions 30c are connected to each other using the third cross member 33 at the substantially central portions thereof in the vertical direction and also connected to each other using the fourth cross member 34 at the substantially central portions between the third cross member 33 and the upper end portion of the seat frame 6 in the vertical direction.

The passenger space S is located between the two side units 30 and is defined as a space enclosed by the front pillar portions 30a, the intermediate pillar portions 30c and the upper beam portions 30d. Inside the passenger space S, the seat 11 is mounted on the upper face of the seat frame 6, and the backrest 12 is installed on the fourth cross member 34.

Figure 3:
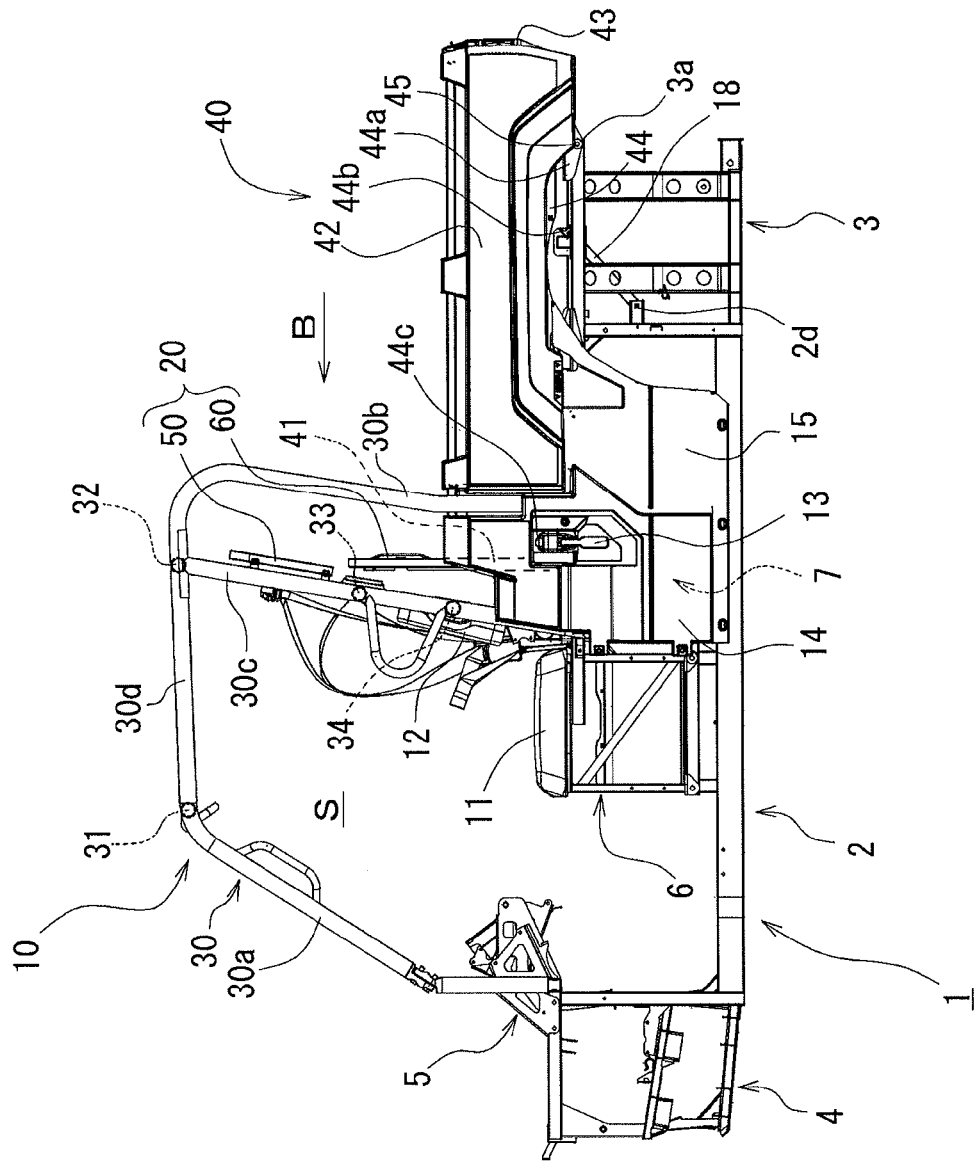
FIG. 3 is a left side view showing the utility vehicle shown in FIG. 1.
Figure 4:
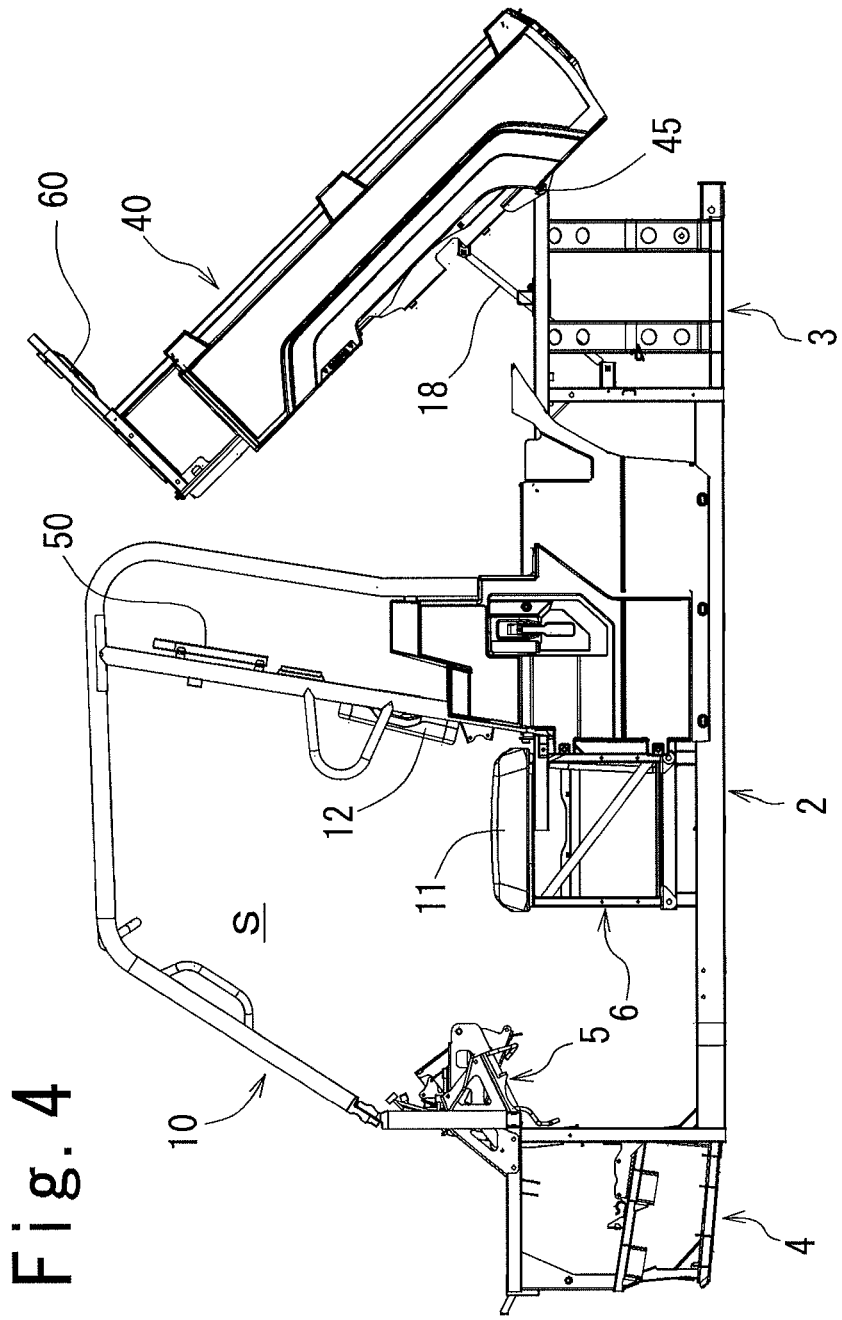
FIG. 4 is a left side view showing the utility vehicle in which a cargo bed has been moved to a dump position.

FIGS. 3 and 4 are left side views of the utility vehicle, showing the cargo bed 40, the cargo bed engaging means 13, first and second side covers 14 and 15, and a screen 20, in addition to the skeleton structure shown in FIG. 1. As shown in FIG. 3, the utility vehicle is equipped with the cargo bed 40 mounted in the cargo bed support region, the pair of left and right cargo bed engaging means 13 for engaging the cargo bed 40 with the vehicle body frame 1, the pair of left and right first side covers 14 and the pair of left and right second side covers 15 for covering both sides of the engine room 7, and the screen 20 disposed between the passenger space S and the cargo bed 40.

The screen 20 is divided into two portions, an upper screen 50 disposed in the R.O.P.S. 10 and a lower screen 60 disposed in the cargo bed 40. Note that, the screen 20 may be divided into three or more portions in the vertical direction, without being limited to be divided into two portions.

The first side cover 14 is disposed between the intermediate pillar portion 30c and the rear pillar portion 30b of the R.O.P.S. 10 so as to cover the area ranging from each of both sides of the front portion of the cargo bed 40 to the region below the cargo bed 40. The second side cover 15 continues to the rear portion of the first side cover 14 and is disposed so as to cover the region below the cargo bed 40.

[Structure of the Cargo Bed 40]

The cargo bed 40 is equipped with pivot shaft mounting portions 44a at its rear lower portion. The pivot shaft mounting portions 44a are rotatably mounted on the cargo bed pivot portions 3a of the rear frame 3 via a pivot shaft 45. Hence, the cargo bed 40 is configured so as to be movable around the pivot shaft 45 as a rotation fulcrum up and down between a normal position (refer to FIG. 3) in which its front portion is in a non-raised state and a dump position (refer to FIG. 4) in which the front portion is in a raised state.

The cargo bed 40 is equipped with a bottom wall 44 and is also equipped with a front wall 41, left and right side walls 42 and a rear wall 43 standing upward from the peripheral portions of the bottom wall 44. The front wall 41 is formed as a front wall portion 621 (refer to FIG. 8) serving as the substantially lower half portion of the lower screen 60. The details will be described later.

At the lower portion of the bottom wall 44, a cargo bed side gas damper mounting portion 44b is provided. A gas damper 18 is installed between the cargo bed side gas damper mounting portion 44b and the frame-side gas damper mounting portion 2d. The gas damper 18 assists the rotation of the cargo bed 40 from the normal position to the dump position and is configured so as to smoothly control the rotation of the cargo bed 40 from the dump position to the normal position. Note that, instead of the gas damper 18, an oil damper in which oil is used as an operating medium may also be adopted.

A pair of left and right hooks 44c is provided at both the front side portions of the bottom wall 44. When the cargo bed 40 is located at the normal position, the hooks 44c are disposed at positions in which the hooks 44c can be engaged with the cargo bed engaging means 13. Also, the hooks 44c may be provided at both the side frames 42d (refer to FIG. 10) which constitute the side wall 42.

Figure 5:
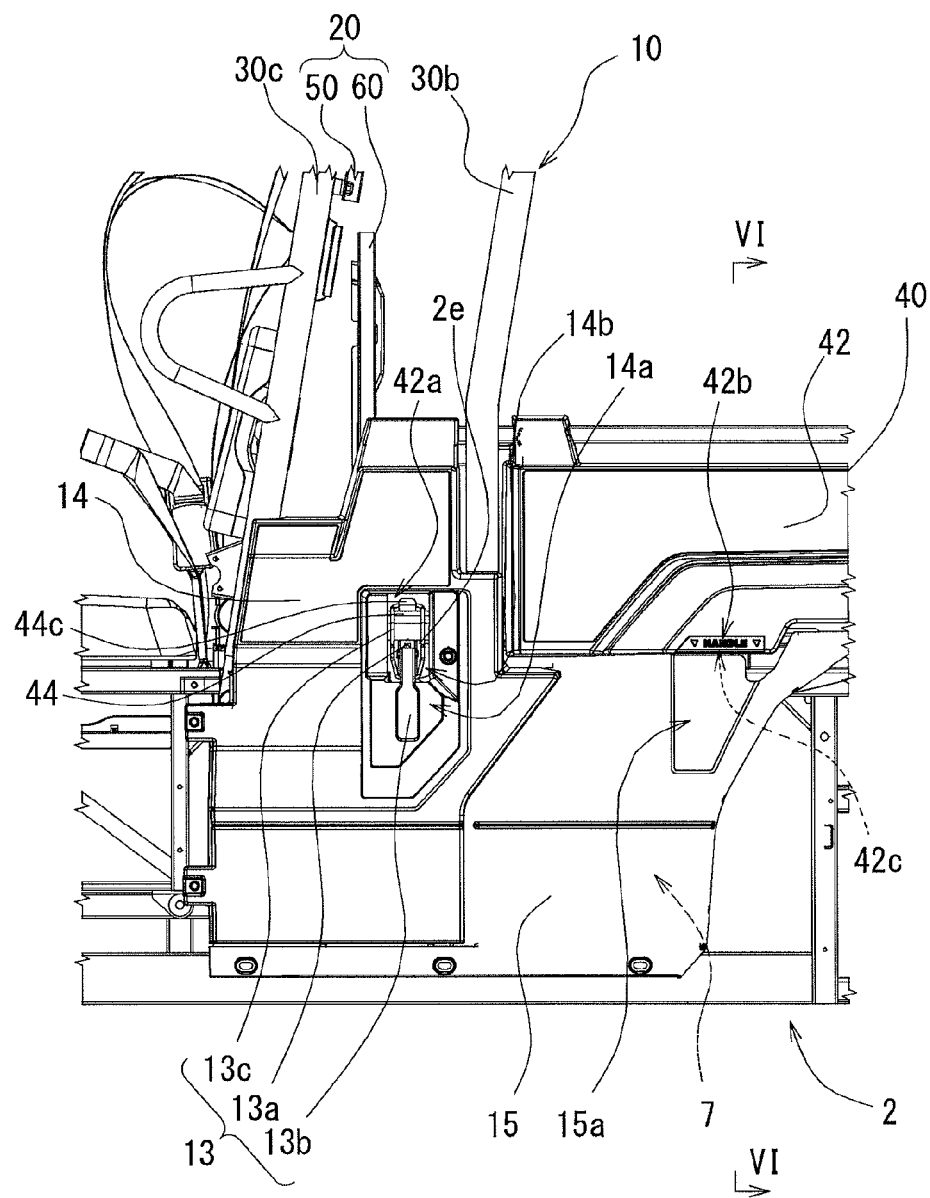
FIG. 5 is an enlarged left side view showing the utility vehicle.

As shown in the enlarged view of FIG. 5, both the side walls 42 are equipped with side wall openings 42a passing through in the width direction of the vehicle and also equipped with embossed letter signs 42b integrally formed with the outer side faces of the walls 42. As an example of the embossed letter sign 42b, "HANDLE" is used to indicate a grip portion that is used to raise the cargo bed 40. The side wall openings 42a are formed so as to face the hooks 44c of the cargo bed 40.

Figure 6:
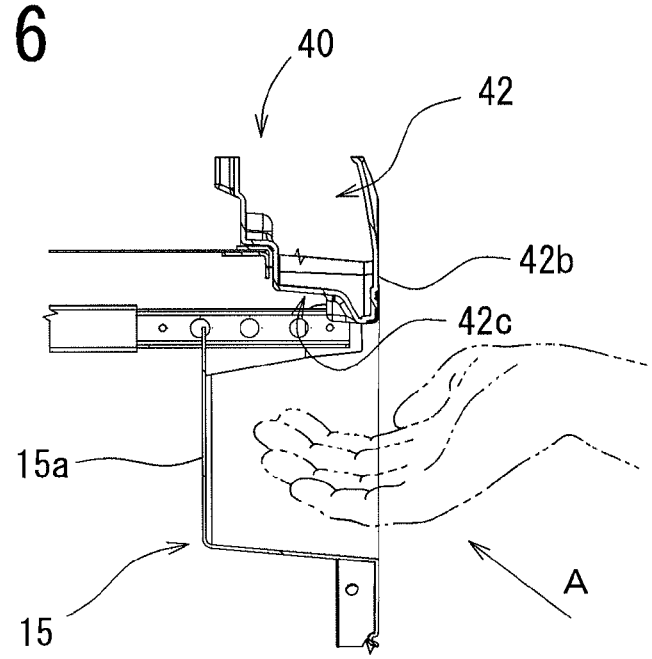
FIG. 6 is a sectional view taken on line VI-VI of FIG. 5.

FIG. 6 is a sectional view taken on line VI-VI of FIG. 5. As shown in FIG. 6, in the lower face of each side wall 42 and at the position corresponding to the embossed letter sign 42b, a concave portion 42c for cargo bed raising use is formed so as to be dented upward. The concave portion 42c for cargo bed raising use is provided inward in the width direction of the vehicle at a position away from the outer surface of the side wall 42 and is configured so as to be hooked by the fingers of the user's hand and gripped by the user's hand easily from the side of the cargo bed 40.

Figure 7:
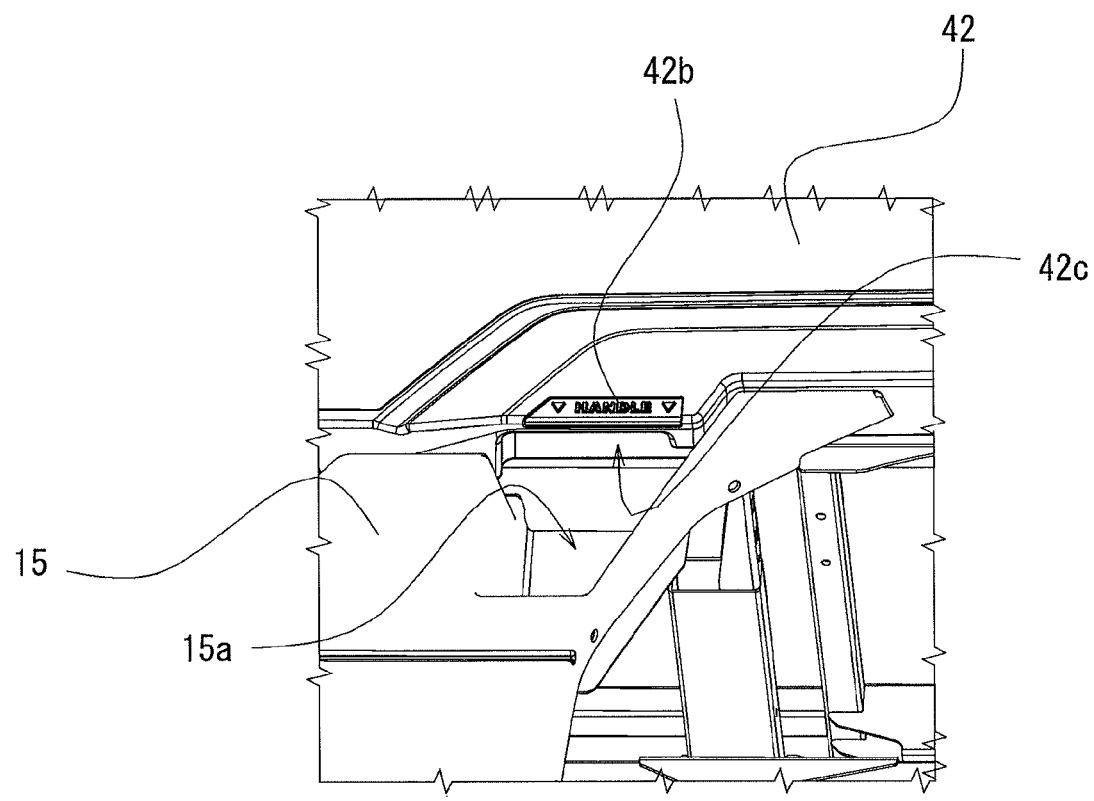
FIG. 7 is a perspective view taken along arrow A in FIG. 6.

FIG. 7 is a perspective view showing the concave portion 42c for cargo bed raising use, taken along arrow A in FIG. 6 and seen from below. As shown in FIG. 7, the concave portion 42c for cargo bed raising use is disposed at the position corresponding to the embossed letter sign 42b. Hence, the fingers of the user's hand can easily gain access to the concave portion 42c for cargo bed raising use by using the embossed letter sign 42b as a guide.

[Configuration of the Cargo Bed Engaging Means 13]

As shown in FIG. 5, the cargo bed engaging means 13 is a lever-type toggle clamp and is equipped with a base member 13a, a lever 13b, the upper portion of which is rotatably mounted on the base member 13a, and a band member 13c, the lower end portion of which is rotatably mounted on the lever 13b. The cargo bed engaging means 13 is mounted on the cargo bed engaging means mounting portion 2e of the main frame 2 via the base member 13a, and is configured so as to be engageable with the hooks 44c by rotating the lever 13b downward while the upper end portion of the band member 13c is hooked with the hook 44c provided on the cargo bed 40.

[Configuration of the First Side Cover 14]

Each first side cover 14 is equipped with a concave portion 14a for cargo bed engaging means 13 use in which the cargo bed engaging means 13 is accommodated. In the concave portion 14a for cargo bed engaging means use, a first side cover opening 14b is formed so that the first side cover openings 14b on the left and right sides pass through in the width direction of the vehicle. The first side cover opening 14b is formed so as to overlap with the cargo bed engaging means mounting portion 2e of the main frame 2 and the hook 44c of the cargo bed 40 as shown in the side view of FIG. 5.

In other words, the state of the hook 44c can be checked through the first side cover opening 14b of the first side cover 14 and the side wall opening 42a of the cargo bed 40 from the side of the cargo bed 40. Hence, the engagement state of the engaging means 13 with the hook 44c can be checked easily.

[Configuration of the Second Side Cover 15]

The second side cover 15 is equipped with a concave portion 15a for hand insertion use. The concave portion 15a for hand insertion use is disposed at the position corresponding to the embossed letter sign 42b of the side wall 42 when the cargo bed 40 is located at the normal position. In other words, as shown in FIGS. 6 and 7, the concave portion 15a for hand, insertion use is formed so that the concave portion 42c for cargo bed raising, use is extended downward when the cargo bed 40 is located at the normal position, thereby being formed so as to have a size sufficient for the fingers of the user's hand to securely gain access to the concave portion 42c for cargo bed raising use.

Consequently, the fingers of the user's hand can easily gain access to the concave portion 42c for cargo bed raising use through the concave portion 15a for hand insertion use from the side of the cargo bed 40 by using the embossed letter sign 42b as a guide, whereby the workability of the dump operation of the cargo bed 40 can be improved.

[Structure of the Screen 20]

Figure 8:
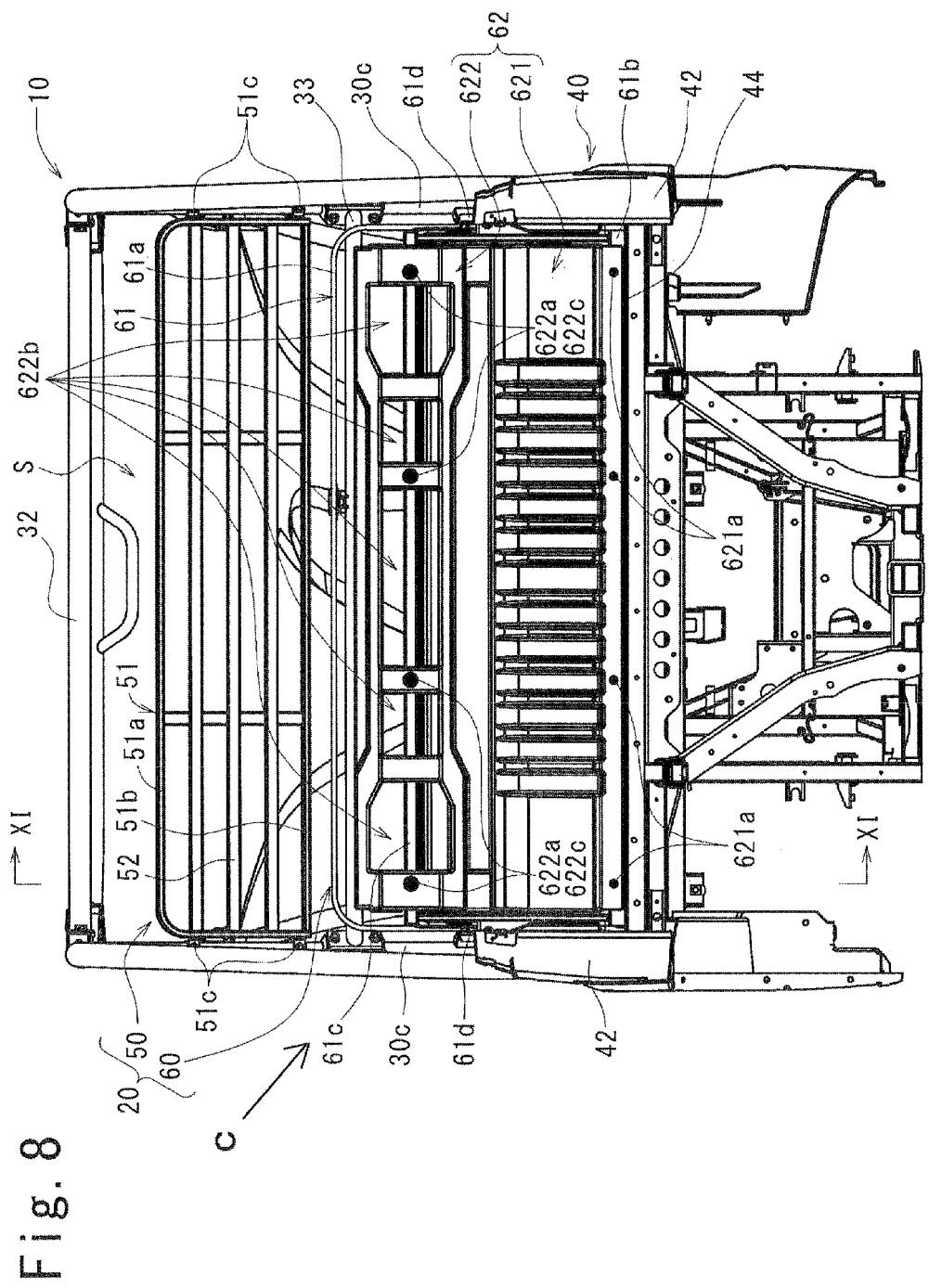
FIG. 8 is a front view showing the cargo bed, taken along arrow B in FIG. 3.

FIG. 8 is a front view showing the cargo bed 40, taken along arrow B in FIG. 3. As describe above, the screen 20 is divided into the upper screen 50 and the lower screen 60 in the vertical direction.

Between the second cross member 32 and the third cross member 33 in the vertical direction, the upper screen 50 is disposed in the width direction of the vehicle, that is, in the left-right direction of the passenger space S, and detachably mounted on both the intermediate pillar portions 30c of the R.O.P.S. 10 with bolts. The upper screen 50 has a lattice or grid shape as a whole and includes an upper frame portion 51 surrounding the four sides of the upper screen 50 and an upper screen body portion 52 disposed in the inner peripheral portion of the upper frame portion 51.

The upper frame portion 51 includes an upper U-shaped member 51a formed into a substantially inverted U shape and a lower end connection member 51b for connecting the lower end portions of the upper U-shaped member 51a. At both the left and right end portions of the upper U-shaped member 51a, mounting portions 51c for mounting the upper frame portion 51 on both the intermediate pillar portions 30c of the R.O.P.S. 10 are provided. The upper screen body portion 52 is formed by combining a plurality of metal pipes into a lattice shape, and its peripheral portion is joined to the inner peripheral face of the upper frame portion 51 by welding. The lattice shape of the upper screen body portion 52 is configured so that the passengers of the vehicle can have a rearward view from the vehicle through the upper screen 50 from the passenger space S.

The lower screen 60 is provided in the range from the upper face of the bottom wall 44 to the height approximately corresponding to the third cross member 33 of the R.O.P.S. 10 over the width of the cargo bed 40. The lower screen 60 includes a lower frame portion 61 and a lower screen body portion 62 mounted inside the lower frame portion 61.

The lower frame portion 61 includes a lower U-shaped member 61a formed into a substantially inverted U shape, a lower end connection member 61b for connecting the lower end portions of the lower U-shaped member 61a, and an intermediate connection member 61c for connecting the left and right sides of the upper portion of the lower U-shaped member 61a at the substantially central portion thereof in the vertical direction. Mounting portions 61d (refer to FIG. 10) for mounting the lower frame portion 61 on both side walls 42 of the cargo bed 40 are provided at both the left and right side portions of the lower U-shaped member 61a.

The lower screen body portion 62 is a resin molded product having a substantially rectangular shape in front view and is equipped with a front wall portion 621 extending between both the side walls 42 of cargo bed 40, and a lower screen portion 622 extending above the front wall portion 621 (that is, on the upper side from the both the side walls 42). The front wall portion 621 is equipped with bolt insertion holes 621a at its lower portion. The lower screen portion 622 is equipped with bolt insertion holes 622a and openings 622b at its substantially central portion in the vertical direction. The openings 622b are formed at positions facing the intermediate connection member 61c.

Figure 9:
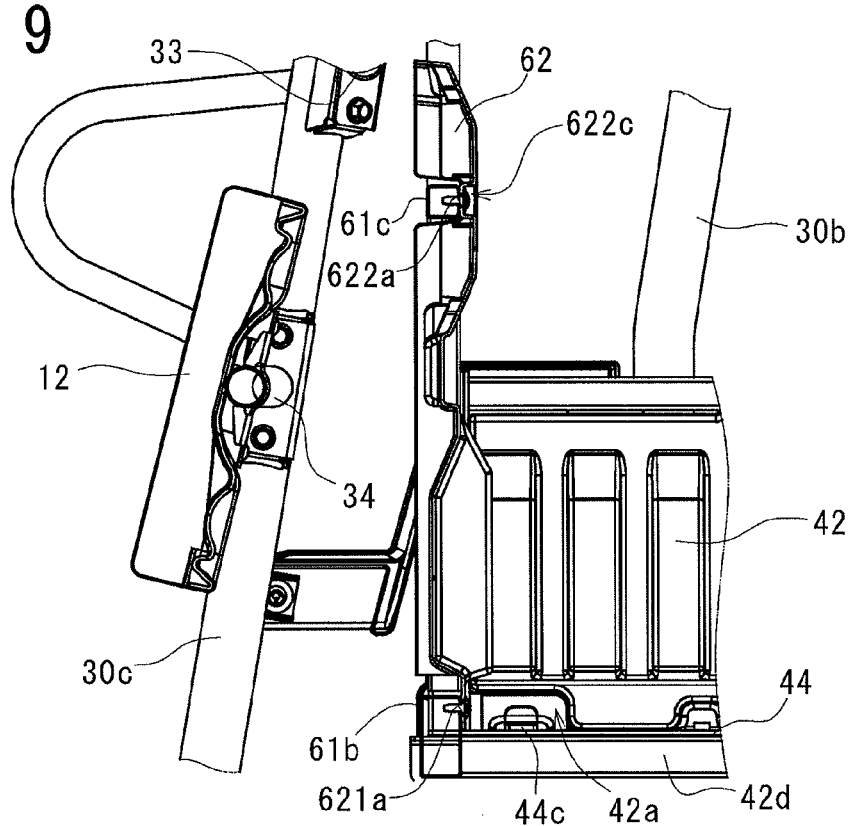
FIG. 9 is a sectional view taken on line IX-IX of FIG. 8.

FIG. 9 is a sectional view taken on line IX-IX of FIG. 8. As shown in FIG. 9, the lower screen body portion 62 is mounted on the lower end connection member 61b with bolts through the bolt insertion holes 621a and also mounted on the intermediate connection member 61c with bolts through the bolt insertion holes 622a. The bolt insertion holes 622a are formed in the bottom portions of concave portions 622c dented forward, and the head portions of the bolts inserted into the bolt insertion holes 622a are accommodated in the concave portions 622c. As can be seen in FIG. 9, the intermediate connection member 61c is within the openings 622b of the lower screen portion 622.

Figure 10:
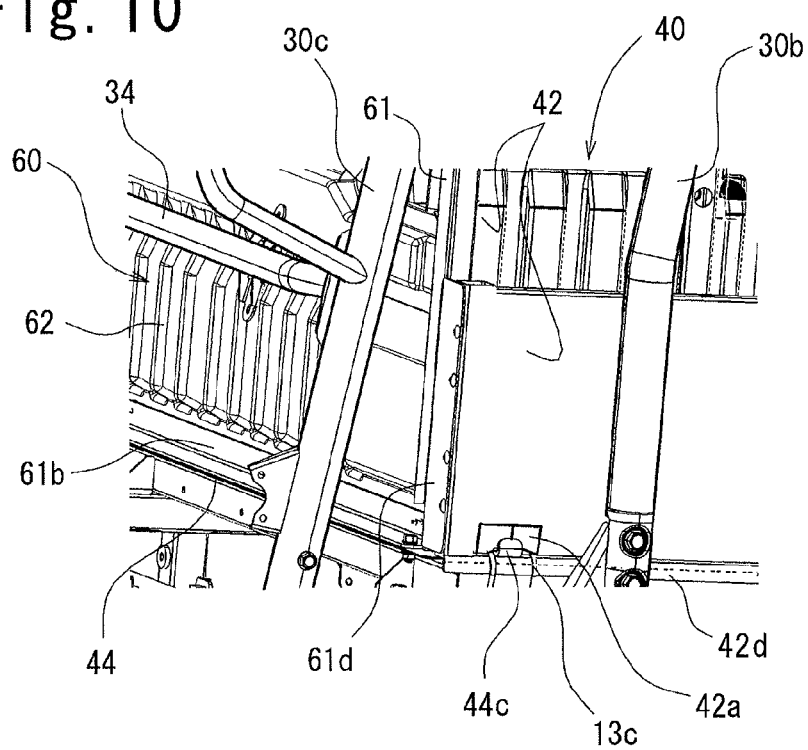
FIG. 10 is a perspective view showing the cargo bed, seen from left front.

FIG. 10 is a perspective view showing the connection portions between the lower screen 60 and the cargo bed 40. As shown in FIG. 10, the lower screen 60 is detachably mounted with bolts on the front end portion of the bottom wall 44 of the cargo bed 40 via the lower end connection member 61b and is also detachably mounted with bolts on the front end portions of both the side walls 42 of the cargo bed 40 via the left and right mounting portions 61d.

[Dump Operation of the Cargo Bed 40]

Figure 11:
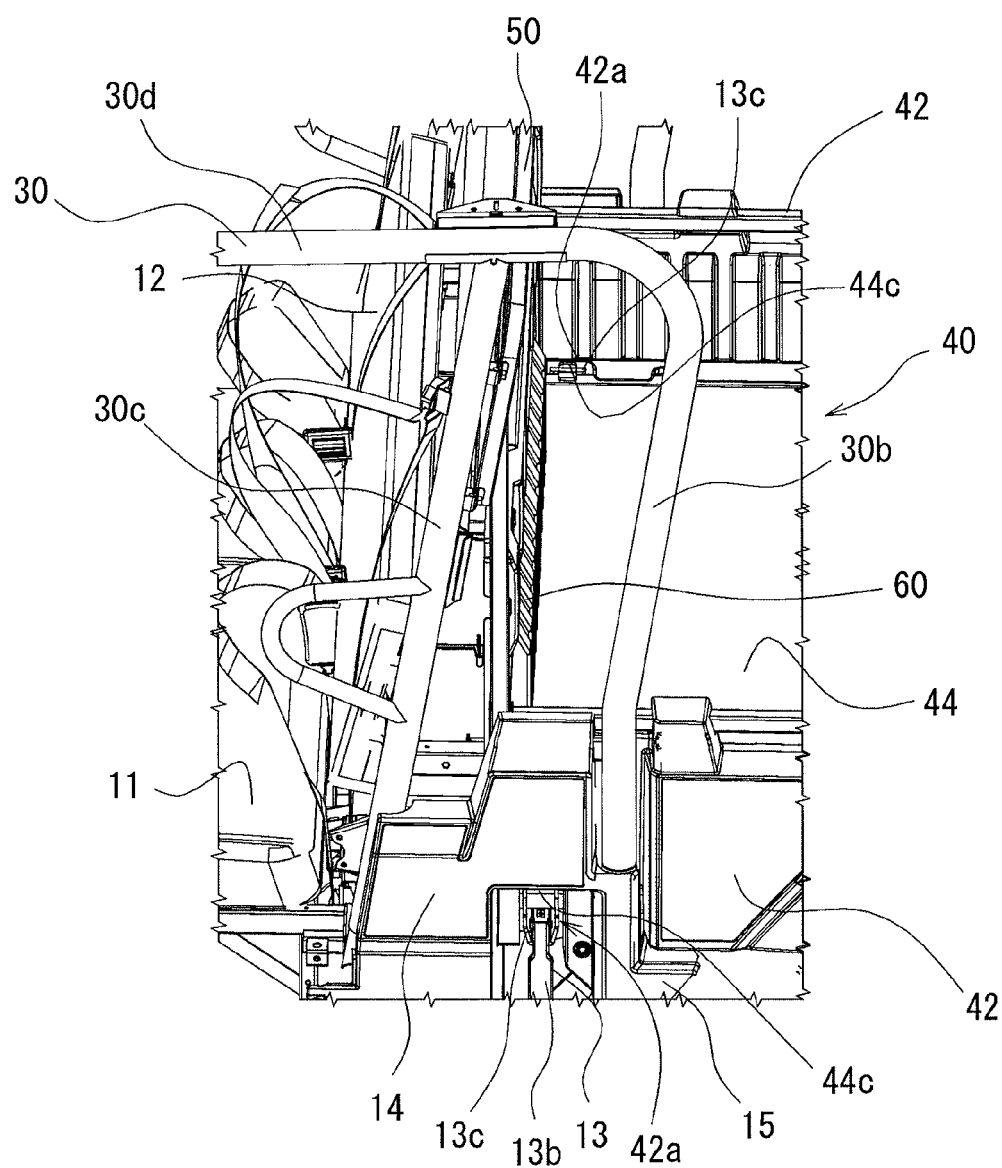
FIG. 11 is a perspective view showing the cargo bed, taken along arrow C in FIG. 8.

The dump operation of the cargo bed 40 will be described referring to FIGS. 11 and 12. FIG. 11 is a perspective view of the cargo bed 40, taken along arrow C in FIG. 8 and seen from above, and FIG. 12 is a left side view of the utility vehicle, showing the dump operation of the cargo bed 40.

First, the operation method for moving the cargo bed 40 positioned at the normal position to the dump position will be described below. As shown in FIG. 11, on both sides of the cargo bed 40, the hooks 44c of the cargo bed 40 are disengaged by operating the levers 13b of the cargo bed engaging means 13. At this time, since the side wall openings 42a facing the hooks 44c are formed in both the side walls 42, the engagement states of the cargo bed engaging means 13 with both the hooks 44c can be checked from one side of the cargo bed 40. Hence, the time and labor required for the user to move to both sides of the cargo bed 40 to check the engagement states of both the hooks 44c with both the cargo bed engaging means 13 can be omitted.

Figure 12:
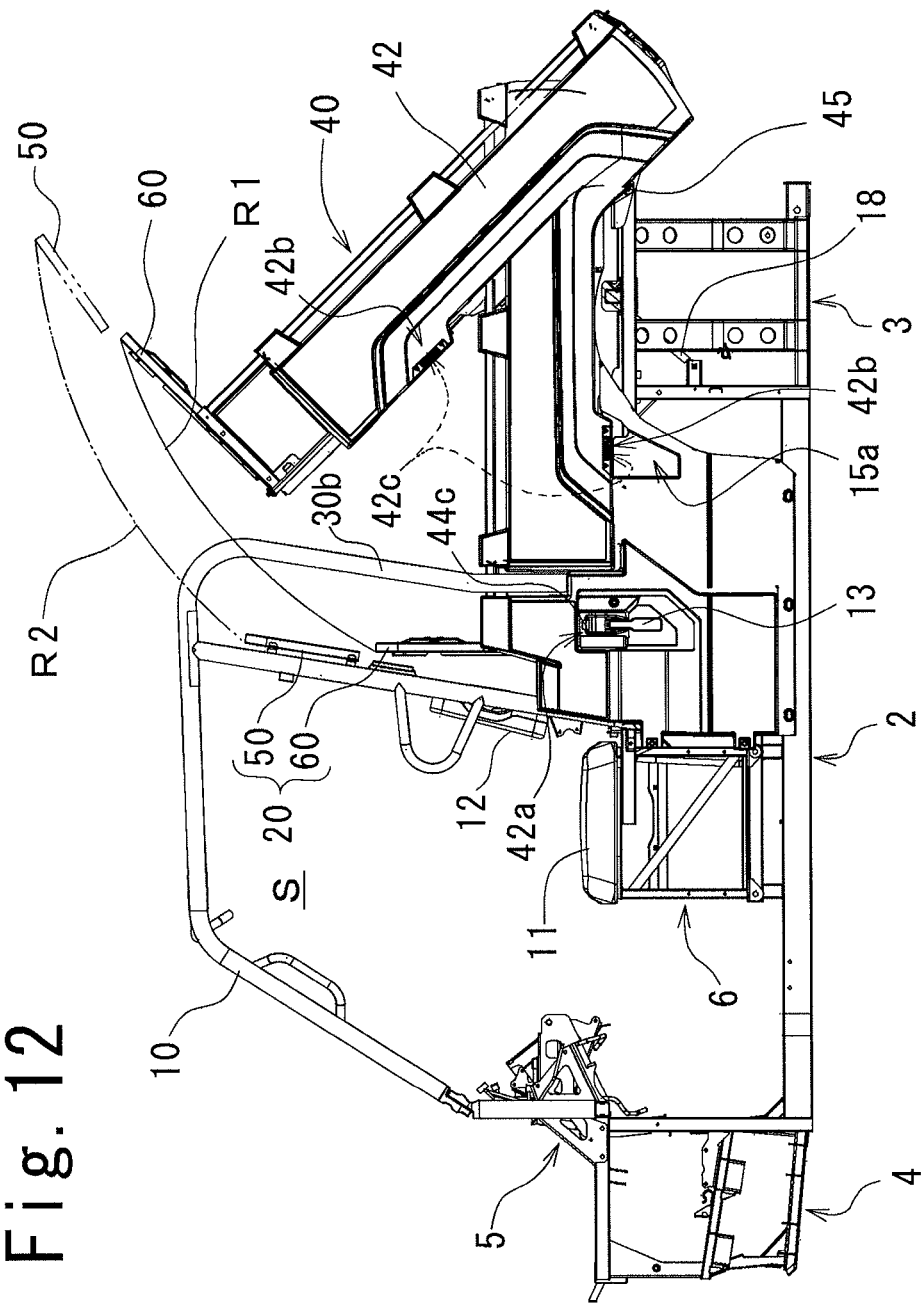
FIG. 12 is a left side view of the utility vehicle, showing the dump operation of the cargo bed.

Next, as shown in FIG. 12, on one side of the cargo bed 40, the user's hand is inserted into the concave portion 42c for cargo bed raising use from the concave portion 15a for hand insertion use, and while the concave portion 42c for cargo bed raising use is gripped, the cargo bed 40 is rotated so as to be raised upward. Since the rotation of the cargo bed 40 to the dump position is assisted by the energizing force of the gas damper 18 at this time, the cargo bed 40 can be rotated easily to the dump position.

The cargo bed 40 is rotated to the dump position with the pivot shaft 45 used as a rotation fulcrum. The dump position is determined by the stroke limit of the gas damper 18, and the cargo bed 40 is held at the dump position by the energizing force of the gas damper 18.

Next, the operation method for moving the cargo bed 40 located at the dump position to the normal position will be described below. The upper portion of the cargo bed 40, for example, the upper portion of the side wall 42, is gripped and the cargo bed 40 is pulled downward. At this time, the rotation movement of the cargo bed 40 from the dump position to the normal position is controlled slowly by the gas damper 18. As shown in FIG. 11, in a state in which the cargo bed 40 is located at the normal position, the left and right hooks 44c provided on the cargo bed 40 are engaged with the cargo bed engaging means 13. At this time, the engagement states of both the hooks 44c can be checked easily from one side of the cargo bed 40 through the side wall openings 42a provided in both the side walls 42.

Furthermore, as shown in FIG. 12, the screen 20 is divided into two portions in the vertical direction, that is, the upper screen 50 and the lower screen 60, so that only the lower screen 60 is rotated together with the cargo bed 40 during the dump operation. Hence, the rotation locus R1 of the cargo bed 40 can be made smaller than the rotation locus R2 of the cargo bed 40 in the case that the screen 20 is integrated with the cargo bed 40.

Consequently, even in the case that a member disposed above, for example, a roof portion, is provided for the utility vehicle or even in the case that a cross member is provided to connect both the rear pillar portions 30b, the interference between the rotation locus R1 of the cargo bed 40 and these members can be avoided easily. Hence, it is possible to improve not only the degree of freedom of designing the screen but also the degrees of freedom of designing the roof portion and the cross member. Furthermore, even in the case that surrounding objects placed on roads or surrounding objects, such as the roof portions of parking areas, are located around the upper part of the utility vehicle, interference with these surrounding objects can be avoided easily. In other words, it is possible to alleviate height limitation with respect to the dump operation of the cargo bed 40.

In the utility vehicle according to the above-mentioned embodiment, the following advantages can be achieved.

(1) Since the screen 20 is configured so as to be divided into two portions in the vertical direction, that is, the upper screen 50 and the lower screen 60, the upper screen 50 and the lower screen 60 can be configured so as to have specifications suited for the portions in which the upper screen and the lower screen are respectively disposed. Hence, the degree of freedom of designing the screen 20 is improved, and the marketability of the screen 20 can be improved.

In other words, the upper screen 50 is formed into a lattice shape, the lower screen 60 is made of resin, and openings are provided only above the front wall 41 of the cargo bed 40. With this configuration, rearward visibility can be ensured through the upper screen 50 from the passenger space S. Furthermore, since the upper screen 50 and the lower screen 60 are configured so as to have specifications different from each other, the upper screen 50 and the lower screen 60 can be produced at low cost while suitably satisfying required functions.

(2) The rotation locus R1 of the cargo bed 40 can be configured so as to be small during the dump operation although the screen 20 is configured so as to be extended in the direction of the height of the passenger space S. Hence, it is possible to easily avoid the interference between the rotation locus of the cargo bed 40 and the roof portion and the cross member provided in the upper portion of the utility vehicle and/or surrounding objects and the like located around the upper area of the utility vehicle. In other words, the degrees of freedom of designing the screen 20, the roof portion, the cross member, etc. can be improved while the performance of the screen is ensured.

(3) Since the lower screen 60 is molded with resin, the lower screen 60 can be made light in weight. Hence, the workability of the dump operation of the cargo bed 40 can be improved.

(4) Since the upper screen 50 is made of a metal pipe and formed into a lattice shape, the upper screen 50 can be produced at low cost.

[Other Embodiments]

Instead of the upper screen 50 formed into a lattice shape, screens having various shapes can be adopted in the present invention. For example, it is possible to use screens made of lath metal, punching metal or the like provided with numerous openings having a size large enough to allow the passengers of the vehicle to confirm the rearward view of the vehicle.

Figure 13:
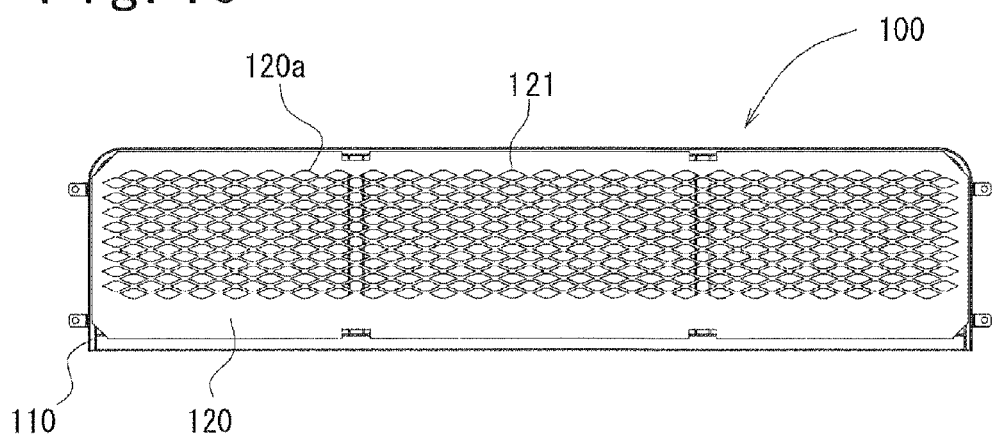
FIG. 13 is a front view showing an upper screen according to another embodiment 1.

Moreover, it is also possible to adopt an upper screen 100 according to another embodiment 1 shown in FIG. 13. The upper screen 100 is equipped with an upper frame portion 110 and an upper screen body portion 120. Punched-out openings 121 such as those of lath metal and having a size large enough to allow the passengers of the vehicle to confirm the rearward view of the vehicle are formed in the inner area of the upper screen body portion 120 excluding its peripheral portion. Hence, the cost of the screen can be made lower than that in the case that lath metal, punching metal or the like is adopted, while the rearward visibility through the upper screen 100 is ensured.

The reason for this cost reduction is described below. Since the peripheral portion of lath metal or the like is discontinuous, it is not easy to join the entire circumference of the peripheral portion to frame members. The peripheral portion is held between a pair of frame members around the entire circumference together with a sound absorbing material to suppress the generation of noise from unjoined portions. Hence, the structure for joining lath metal or the like to the frame members becomes complicated and its cost is increased. However, with another embodiment 1, the punched-out openings such as those of lath metal are formed only in the inner area of the upper screen body portion excluding the peripheral portion, whereby the peripheral portion is not discontinuous. Hence, unlike the above-mentioned case in which lath metal, punching metal or the like is adopted, the structure for joining the peripheral portion to the frame members does not become complicated, whereby its cost can be suppressed from increasing.

Figure 14:
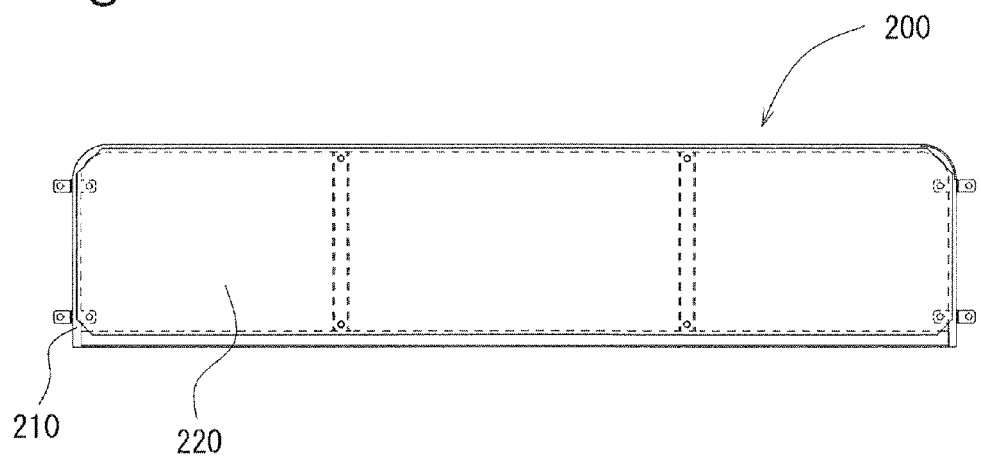
FIG. 14 is a front view showing an upper screen according to still another embodiment 2.

Still further, an upper screen 200 according to another embodiment 2 shown in FIG. 14 can also be adopted. The upper screen 200 is equipped with an upper frame portion 210 and an upper screen body portion 220. The upper screen body portion 220 is made of a transparent member so that the passengers of the vehicle can confirm the rearward view of the vehicle; for example, the upper screen body portion 220 can be made of transparent resin, such as polycarbonate resin.

The present invention is not limited to the above-mentioned embodiments, and can include various modifications conceivable within the scope not departing from the contents of the claims.

What is claimed is:

1. A utility vehicle comprising:
   a roll-over protective structure enclosing a passenger space;
   a cargo bed behind said passenger space, said cargo bed having side walls; and
   a screen between said passenger space and said cargo bed, said screen being divided into a lower screen attached to said cargo bed and an upper screen attached to said roll-over protective structure;
   wherein said cargo bed is rotatably supported on a pivot shaft of a chassis of the utility vehicle so as to be movable up and down between a normal position, in which said cargo bed is in a non-raised state, and a dump position, in which said cargo bed is in a raised state; and
   wherein said lower screen includes:
      a lower frame portion including an intermediate connection member connecting a left side and a right side of said lower frame portion at a substantially upper location thereof with respect to a vertical direction; and
      a lower screen body portion mounted within said lower frame portion, said lower screen body portion being made of a resin material and having a lower screen portion extending upwardly from said side walls of said cargo bed, said lower screen portion having openings penetrating in a front-rear direction at a substantially central location thereof with respect to the vertical direction, said intermediate connection member extending in a vehicle width direction within said openings.

2. The utility vehicle according to claim 1, wherein said upper screen comprises a plurality of metal pipes arranged to form a lattice shape.

3. The utility vehicle according to claim 1, wherein said openings of said lower screen portion are lower openings, said upper screen having upper openings at an inner portion of said upper screen excluding a peripheral portion of said upper screen, said upper openings being sized to allow passengers riding in said passenger space to have a rearward view from the vehicle.

4. The utility vehicle according to claim 1, wherein said upper screen is made of a transparent member.

* * * * *